United States Patent [19]
Park

[11] 3,785,793
[45] Jan. 15, 1974

[54] METHOD OF LEACHING HIGH SILICA GLASS HAVING 0.5–2.0% $P_2O_5$

[75] Inventor: Yong Wan Park, Seoul, South Korea

[73] Assignee: National Industrial Research Institute, Seoul, South Korea

[22] Filed: May 26, 1972

[21] Appl. No.: 257,383

[30] Foreign Application Priority Data
May 31, 1971 South Korea .............................. 746

[52] U.S. Cl. .......................... 65/31, 106/54, 156/17
[51] Int. Cl. ............................................. C03c 15/00
[58] Field of Search ..................... 65/31; 106/54; 156/17

[56] References Cited
UNITED STATES PATENTS

| | | | |
|---|---|---|---|
| 2,100,391 | 11/1937 | Grimm et al. | 106/54 X |
| 2,106,744 | 2/1938 | Hood et al. | 106/54 X |
| 2,355,746 | 8/1944 | Nordberg et al. | 65/31 |
| 2,925,351 | 2/1960 | Judd | 106/54 X |
| 3,456,169 | 7/1969 | Klein | 156/17 X |
| 3,615,773 | 10/1971 | Obidina | 106/54 |

Primary Examiner—Robert L. Lindsay, Jr.
Attorney—William E. Schuyler, Jr. et al.

[57] ABSTRACT

The addition of small controlled amounts of $P_2O_5$ to a borosilicate glass improves the speed and homogenity of phase separation upon heating of the glass. A borosilicate glass of the formula 65–75 percent $SiO_2$, 15–25% $B_2O_3$, 5–10% $R_2O$ and 0.5–2.0% $P_2O_5$, wherein R is Na, K or Li, is heated and undergoes phase separation into a silica rich phase and an acid soluble $R_2O - B_2O_3 - P_2O_5$ phase. The acid soluble phase is leached with acid to form a porous high silica glass which can be reheated at about 1,200°C to contract the glass thereby yielding a transparent nonporous glass of properties similar to quartz glass.

6 Claims, No Drawings

METHOD OF LEACHING HIGH SILICA GLASS HAVING 0.5-2.0% $P_2O_5$

BACKGROUND OF THE INVENTION

This invention is directed to a method of preparing porous glass compositions and high silica glasses.

Processes for preparing porous glass and high silica glasses are known and exemplified by U.S. Pat. Nos. 2,106,744 and 2,221,709. These processes involve formation of an alkali metal oxide borosilicate glass. The glass is then heat treated to induce separation of the glass into two phases, one relatively rich in silica and the other consisting primarily of alkali metal oxide and boric oxide. Upon leaching the heat-treated glass with dilute mineral acids, the phase poor in silica is dissolved out, leaving a porous skeleton consisting substantially of pure silicon dioxide. This porous skeleton may be used as such or the porous glass may be heated to cause closing of the pores to yield a high silica glass having many of the properties of fused quartz.

Low alkali borosilicate glass containing about 2 per cent of alumina has great chemical durability. When alumina is not added, or the amounts of alumina in the glass are less than 2 per cent, a portion of the glass having a certain range of composition separates into a water or acid-soluble glass phase upon heat treatment. When a borosilicate glass having a composition $R_2O - B_2O_3 - SiO_2$ comprising 3-11 percent $R_2O$ (R refers to Li, Na, K etc.,), 13-37 percent $B_2O_3$, and 60-80 percent $SiO_2$ is heated at 450°-700°C, it separates into two phases, one having a major portion of $SiO_2$ and the other having a major portion of $R_2O-B_2O_3$.

When the phase-separated glass is treated with acid, $R_2O - B_2O_3$, being soluble dissolves in the acid and a porous structure composed of silica glass skeleton containing above 96 per cent $SiO_2$ remains. This porous silica glass is available for use as a micro-filter, catalyst carrier, molecular sieve, adsorbent, and so on. Transparent and nonporous glass can be produced by treating the porous glass at the high temperature of 900° to 1,200°C. At this temperature the glass will contract around 35 per cent in volume to form a material having physical and chemical properties similar to quartz glass.

Quartz glass is difficult to manufacture directly because of its high melting point and its high viscosity. The foregoing procedure, has great advantage because the melt is conducted at the same temperature as that of ordinary glass, yet the properties of the final product are similar to those of quartz glass.

The foregoing method of making high silica glass has problems however because the glass composition must be carefully controlled to avoid cracking and fragility. Moreover, even when the composition is controlled, the glass has a tendency to become fragile, swell and crack during the various process steps.

This invention is directed toward overcoming the above mentioned problems by adding to the glass composition an additive which homogenizes the phase separation of the glass and decreases the heat treating time for phase separation. The additive is phosphorous pentoxide ($P_2O_5$).

It is not known exactly how the $P_2O_5$ improves the homogenity of the phase separated glass but it is believed that the phosphorous atom acts as a gathering point for the boron and alkali atoms in the glass. Phosphorous (valency: 5, coordination number: 4) combines with four oxygen atoms forming $PO_4$ which is a tetrahedron. While phosphorous is able to attract a fifth oxygen, the atomic radius of phosphorous does not permit the attraction of the oxygen because of its geometrical structure. Therefore, the unsatisfied phosphorous structure remains electrically unstable. This instability tends to aggregate boron, sodium, and phosphorous oxide groups together in the glass.

Minor quantities of $P_2O_5$ have been detected in alkali borosilicate glasses which have been subsequently phase separated and leached. This is disclosed in U.S. Pat. No. 3,630,700. However the amounts of $P_2O_5$ have been such that they had no noticeable affect on the phase separation. This may have been because alumina was also present. Large quantities of phosphorous pentoxide have been added to borosilicate glasses along with aluminum oxide to enhance the leachability of the glasses. Such a disclosure is found in U.S. Pat. No. 2,480,672. However the amount of phosphorous pentoxide added is 7 to 24 per cent and there must be a substantial amount of aluminum present, i.e., approximately 5 to 15 per cent aluminum oxide.

It is an object of this invention to accelerate the phase separation and produce a glass of more homogeneous phase separation by adding to a borosilicate glass of the composition $SiO_2$, $B_2O_3$, $R_2O$, (wherein R is Na, K, Li, etc.) a controlled amount of $P_2O_5$ within the range 0.5-3 percent by weight based upon the weight of the glass composition.

In yet another aspect of this invention the controlled amount of $P_2O_5$ in the borosilicate glass is within the range 1-3 percent by weight based upon weight of the glass composition.

It is a further object of this invention to utilize a particularly preferred concentration of from about 0.5 to about 2 percent $P_2O_5$ to accelerate the phase separation of a borosilicate glass.

In yet another aspect of this invention, the controlled amount of $P_2O_5$ within the range 0.5-3 percent or 0.5 to 2.0 percent is added to a borosilicate glass of the formula $SiO_2$, $B_2O_3$, $R_2O$ (wherein R is Na, K, Li, etc.) which is free from added alumina or has only minor amounts i.e., less than 2 percent alumina, based upon the weight of the borosilicate glass as an impurity.

In still another aspect of this invention, the borosilicate glass to which the $P_2O_5$ has been added comprises 65-75 percent $SiO_2$, 15 to 25 percent $B_2O_3$, 5-10 percent $R_2O$ (wherein R is Na, K or Li) and 1-3 percent $P_2O_5$.

Test specimens of base borosilicate glass were prepared with varying the addition of $P_2O_5$ from 0 to 0.1 in molar ratio at fixed proportion ration of $SiO_2 : B_2O_3 : Na_2O = 6.0:1 5:0.5$ as illustrated in Table 1.

TABLE 1

Compositions of Base Borosilicate Glasses

| Sample No. | Molar Ratio | | | | Weight Per Cent | | | |
|---|---|---|---|---|---|---|---|---|
| | $SiO_2$ | $B_2O_3$ | $Na_2O$ | $P_2O_5$ | $SiO_2$ | $B_2O_3$ | $Na_2O$ | $P_2O_5$ |
| 0 | 6.0 | 1.5 | 0.5 | 0 | 72.67 | 21.07 | 6.26 | 0 |
| 1 | 6.0 | 1.5 | 0.5 | 0.02 | 72.23 | 20.93 | 6.22 | 0.57 |
| 2 | 6.0 | 1.5 | 0.5 | 0.04 | 71.87 | 20.81 | 6.19 | 1.13 |
| 3 | 6.0 | 1.5 | 0.5 | 0.05 | 71.47 | 20.69 | 6.15 | 1.69 |
| 4 | 6.0 | 1.5 | 0.5 | 0.08 | 71.07 | 20.57 | 6.12 | 2.24 |
| 5 | 6.0 | 1.5 | 0.5 | 0.10 | 70.68 | 20.46 | 6.08 | 2.78 |

The specimens were melted at around 1,550°C, and then quenched in cool water. These specimens were heated at 550°C for eight hours for phase separation. Alkali solubility tests were performed by employing 1 g of sample, which is added in 50 ml of distilled water and heated at 100°C. The solution treated as above was titrated with N/20 $H_2SO_4$. The results of the alkali solubility tests are represented in Table 2.

TABLE 2

Alkali Solubility of the Samples

| Sample No. | N/20 $H_2SO_4$ Consumption (ml) |
|---|---|
| 0 | 9.0 |
| 1 | 13.4 |
| 2 | 15.4 |
| 3 | 18.0 |
| 4 | 4.7 |
| 5 | 1.0 |

Alkali solubility is increased with increasing the addition amount of phosphorous oxide as shown in Table 2. This fact illustrates that the addition of phosphorous oxide to borosilicate glass decreases considerably the heating time necessary required for the phase separation step in the production of high silica glass. At the same time the phase-separated glass to which phosphorous oxide had been added maintained the original shape without any damages caused by cracking or swelling.

The porous glass leached with acid has high physical strength, and is suitable for use in molecular sieve catalyst carrier and adsorbent applications. It was found the effect of the addition of phosphorous oxide on the porous high silica glass was to bring about a more homogeneous distribution of pores and many other advantages in processing of high silica glass.

The base glass compositions of this invention comprise 65-75 percent $SiO_2$, 15-25 percent $B_2O_3$, 5-10 percent $R_2O$ (R refers to Li, Na, K, etc.,) and 1.0 - 3.0 percent $P_2O_5$. The glass of this composition is heated at near its softening point for 10-20 hours to accelerate the phase separation into $SiO_2$ rich glass and $R_2O—B_2O_3—P_2O_5$ glass. High silica glass is produced by acid-treatment solving out the acid-soluble $R_2O—B_2O_3—P_2O_5$ glass. Transparent high silica glass, can be prepared by heating the resultant porous glass at above 1,000°C. The addition of small amounts phosphorous oxide, which have hitherto not been added any borosilicate glass for the express purpose of accelerating the phase separation, promotes uniform and almost complete phase separation in about 15 hours.

The following example is intended to illustrate but not limit the scope of the invention.

The following ingredients were blended and melted at 1.500°C: $SiO_2$ - 71 percent; $B_2O_3$ - 21 percent; $R_2O$ - 6 percent; $P_2O_5$ - 2 percent. The molten glass is prepared, refined and homogenized using conventional glass making techniques. The molten glass is then molded into a desired shape. For phase separation the moulded glass is heated at 550°C for 15 hours, and then allowed to cool. The heat treated glass is then acid treated at 100°C with hydrochloric acid or sulphuric acid in order to leach out the acid soluble phase. The thus processed porous glass possesses a very homogeneous structure and has high mechanical strength. To obtain transparent silica glass, the leached glass should be heat treated at 1,200°C.

The properties of the final product are as follows:

1. Chemical composition of transparent high silica glass (by weight per cent.).

| $SiO_2$ | $B_2O_3$ | $Na_2O$ | $P_2O_5$ | $Al_2O_3$ |
|---|---|---|---|---|
| 97.06 | 2.45 | 0.05 | 0.24 | 0.17 |

2. Physical properties of transparent high silica glass.

Softening temperature (°C) — 1,520
Annealing temperature (°C) — 900
Thermal expansion coefficient — $80 \times 10^{-7}$
Specific gravity — 2.19

What is claimed is:

1. A process for preparing high silica glass comprising:
    1. heating a borosilicate glass of the composition $SiO_2$, $B_2O$, $R_2O$, wherein R is Na, K or Li, said glass composition comprising less than 2 percent $Al_2O_3$, said glass having 0.5-2 percent $P_2O_5$ added thereto, whereby said glass composition undergoes homogeneous phase separation into a $SiO_2$ glass phase and an acid soluble $R_2O — B_2O_3 — P_2O_5$ glass phase, and
    2. leaching out the acid soluble $R_2O — B_2O_3 — P_2O_5$ glass phase to form a porous high silica glass.

2. The process of claim 1 wherein the porous high silica glass is reheated at a temperature sufficient to contract the glass.

3. The process of claim 2 wherein the temperature of reheating is about 1,200°C.

4. The process of claim 1 wherein the amount of $P_2O_5$ added is in the range 0.57 - 1.69 percent.

5. The process of claim 1 wherein the borosilicate glass comprises 65-75 percent $SiO_2$, 15 to 25 percent $B_2O_3$, 5 to 10 percent $R_2O$ and 0.5 to 2.0 percent $P_2O_5$.

6. The process of claim 5 wherein the porous high silica glass is reheated at a temperature sufficient to contract the glass.

* * * * *